（12）United States Patent
Au (10) Patent No.: US 10,911,465 B1
(45) Date of Patent: Feb. 2, 2021

(54) MULTI-STAGE INTRUSION DETECTION SYSTEM ALARM RANKING SYSTEM

(71) Applicant: THE UNITED STATES OF AMERICA AS REPRESENTED BY THE SECRETARY OF THE NAVY, San Diego, CA (US)

(72) Inventor: Henry Gwok Wing Au, Honolulu, HI (US)

(73) Assignee: United State of America as Represented by the Secretary of the Navy, Washington, DC (US)

( * ) Notice: Subject to any disclaimer, the term of this patent is extended or adjusted under 35 U.S.C. 154(b) by 324 days.

(21) Appl. No.: 16/013,551

(22) Filed: Jun. 20, 2018

Related U.S. Application Data

(60) Provisional application No. 62/650,189, filed on Mar. 29, 2018.

(51) Int. Cl.
*G06F 21/00* (2013.01)
*H04L 29/06* (2006.01)

(52) U.S. Cl.
CPC .......... *H04L 63/1416* (2013.01); *H04L 63/20* (2013.01)

(58) Field of Classification Search
CPC ....................................................... H04L 63/20
See application file for complete search history.

(56) References Cited

U.S. PATENT DOCUMENTS

| | | | | |
|---|---|---|---|---|
| 2004/0133402 A1* | 7/2004 | Iwasawa | ............ | G05B 23/0272 702/188 |
| 2008/0141332 A1* | 6/2008 | Treinen | ............... | H04L 63/1416 726/1 |
| 2008/0291018 A1* | 11/2008 | Dacier | .................... | H04L 63/20 340/541 |
| 2014/0032895 A1* | 1/2014 | Moon | ................. | G06F 9/44505 713/100 |
| 2014/0181968 A1* | 6/2014 | Ge | ...................... | H04L 63/1425 726/23 |

OTHER PUBLICATIONS

Amdahl, G., "Validity of the single processor approach to achieving large scale computing capabilities." AFIPS Spring Joint Computer Conference, 1967

(Continued)

*Primary Examiner* — Josnel Jeudy
(74) *Attorney, Agent, or Firm* — Naval Information Warfare Center, Pacific; Kyle Eppele; James Eric Anderson (57) ABSTRACT

Alarms, including features such as source IP address, destination IP address, and timestamp, generated by an intrusion detection system are grouped into clusters. A rank value for each alarm within each cluster is determined by summing a weighted value for each feature within the respective alarm. A cluster rank is determined by summing each of the rank values within each cluster and dividing by the number of alarms in the respective cluster. The source IP address is used to determine a network IP address and subnet of a network architecture associated with the source IP address. The cluster ranks are displayed graphically to a user using a graphical database within a graphical user interface. Each of the clusters are mapped to a node link pair in the graphical database using an a priori logical network topology based upon the network IP address and the subnet of the network architecture.

16 Claims, 11 Drawing Sheets

(56) References Cited

OTHER PUBLICATIONS

Cuda C Best Practices Guide, [online], http://docs.nvidia.com/cuda/cuda-c-best-practices-guide/, Jul. 6, 2020.
Gustafson, J., "Reevaluating Amdahl's Law", Communications of the ACM, vol. 31 No. 5, 1988.
Hachmi, F. and Mohamed, L., "A Two-Stage Technique to Improve Intrusion Detection Systems Based on Data Mining Algorithms", 5th International Conference on Modeling, Simulation and Applied Optimization, ICMSAO, Apr. 28-30, pp. 1-6, 2013.
Liao, W., "Parallel k-means Data Clustering", [online], http://users.eecs.northwestern.edu/~wkliao/Kmeans/index.html, 2013.
NVIDIA CUDA Programming Guide, [online], http://docs.nvidia.com/cuda/cuda-c-programming-guide/, Jul. 6, 2020.
Remya, R. and Anil, S., "A Hybrid Method Based on Genetic Algorithm, Self-Organised Feature Map, and Support Vector Machine for Better Network Anomaly Detection", Fourth International Conference on Computing, Communications and Networking Technologie, ICCCNT, pp. 1-5, 2013.
Shi, Y., "Reevaluating Amdahl's Law and Gustafson's Law", Temple University, 1996.
Zechner, M., "Accelerating k-means on the Graphics Processor via CUBA", Intensive Applications and Services, Apr. 20-25, pp. 7-15 2009.

\* cited by examiner

```
(Event)
        sensor id: 0      event id: 1      event second: 920898013 event microsecond: 194424
        sig id: 8         gen id: 125      revision: 1          classification: 3
        priority: 3       ip source: 206.48.44.18 ip destination: 172.16.112.100
        src port: 1054    dest port: 21    protocol: 6          impact_flag: 0   blocked: 0
Packet
        sensor id: 0      event id: 1      event second: 920898013
        packet second: 920898013           packet microsecond: 194424
        linktype: 1       packet_length: 80
    [ 0] 00 10 7B 38 46 32 00 C0 4F A3 58 23 08 00 45 00   ..{8F2..O.X#..E.
    [16] 00 42 9C 00 40 00 7F 06 47 FE CE 30 2C 12 AC 10   .B..@...G..0,...
    [32] 70 64 04 1E 00 15 00 17 AD 57 00 17 AF 17 50 18   pd.......W....P.
    [48] 21 A2 21 89 00 00 70 6F 72 74 20 31 39 39 2C 31   !.!...port 199,1
    [64] 39 39 2C 31 39 39 2C 31 39 39 2C 30 2C 38 30 0A   99,199,199,0,80.
```

| Unified2 IDS Event | |
|---|---|
| Snort Field | Size |
| sensor id | 4 bytes |
| event id | 4 bytes |
| Snort Field | Size |
| event second | 4 bytes |
| event microsecond | 4 bytes |
| signature id | 4 bytes |
| generator id | 4 bytes |
| signature revision | 4 bytes |
| classification id | 4 bytes |
| priority id | 4 bytes |
| ip source | 4 bytes |
| ip destination | 4 bytes |
| source port/icmp type | 2 bytes |
| dest. port/icmp code | 2 bytes |
| protocol | 1 byte |
| impact flag | 1 byte |
| impact | 1 byte |
| blocked | 1 byte |
| mpls label | 4 bytes |
| vlan id | 2 bytes |
| padding | 2 bytes |

| Unified2 IDS Event Packet | |
|---|---|
| Snort Field | Size |
| sensor id | 4 bytes |
| event id | 4 bytes |
| event seconds | 4 bytes |
| event microseconds | 4 bytes |
| link type | 4 bytes |
| packet length | 4 bytes |
| packet data | <variable length> |

N: *number of data objects*
K: *number of clusters* objects[N]: *array of data objects*
clusters[K]: *array of cluster centers*
membership[N]: *array of object memberships* kmeans_clustering( )
1  while $\delta$/N > threshold
2    $\delta \leftarrow 0$
3    for i $\leftarrow$ 0 to N-1
4      for j $\leftarrow$ 0 to K-1
5        distance $\leftarrow$ | objects[i] - clusters[j] |
6        if distance < $d_{min}$
7          $d_{min} \leftarrow$ distance
8          n $\leftarrow$ j
9      if membership[i] $\neq$ n
10        $\delta \leftarrow \delta + 1$
11        membership[i] $\leftarrow$ n
12      new_clusters[n] $\leftarrow$ new_clusters[n] + objects[i]
13      new_cluster_size[n] $\leftarrow$ new_cluster_size[n] + 1
14    for j $\leftarrow$ 0 to K-1
15      clusters[j][*] $\leftarrow$ new_clusters[j][*] / new_cluster_size[j]
16      new_clusters[j][*] $\leftarrow$ 0
17      new_cluster_size[j] $\leftarrow$ 0

MULTI-STAGE INTRUSION DETECTION SYSTEM ALARM RANKING SYSTEM

CROSS REFERENCE TO RELATED APPLICATIONS

This application claims the benefit of U.S. Provisional Patent Application Ser. No. 62/650,189 filed Mar. 29, 2018, entitled "Multi-Stage Intrusion Detection System Alarm Ranking System", the content of which is fully incorporated by reference herein.

FEDERALLY SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103787.

BACKGROUND

Networking architectures and modern communication technologies have enabled reliable high speed communication for small network systems hosting tens of thousands of users to enterprise systems connecting hundreds of thousands of users across multiple network architectures. However, this increased reliance on networked systems for communication, control, and services results in an ever increasing cyber-attack surface. Not only is the attack surface much larger, the complexity of network designs utilizing multiple firewalls, Network Address Translators (NAT), and Virtual Local Area Network (VLAN) have added a layer of difficulty when determining cyber-attacks and their respective operational impact.

Typical network defense tools include, utilizing firewalls, whitelisting IPs, network access controls, anti-malware software, and more prominently deployed Intrusion Detection Systems (IDS). IDS logs provide the first line in cyber defense and a major indicator of possible cyber threats. However, IDS logs do not provide the network context and network architecture required to accurately assess the degree and depth of a cyber-attack. There is a need for a system that can prioritize IDS alarms based upon IP addressed systems that are susceptible to cyber-attack.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

As used herein, the terms "about" and "approximately" generally mean plus or minus 10% of the value stated.

The disclosed embodiments involve a system that automatically ranks and prioritizes particular IP addresses based upon network traffic, user dependency, and other user-defined features such as, but not limited to, protocol type, IP source port, IP destination port, alert type, time stamp, and packet size. More particularly, the disclosed embodiments involve a cyber-relevant analysis engine that allows for clustering alerts, providing network context, and visualizing data to prevent information overload for the analyst. The architecture and graph database technology allows for a web-integrated service for intrusion detection system (IDS) alert analysis that offers a seamless tool capable of processing alerts within minutes using, as an example, a GPU-implemented deterministic k-means clustering algorithm. The system and methods allow the analyst to be cyber-relevant by reducing information overload, providing network context, and supporting network information to facilitate the understanding of intent.

Figure 1:
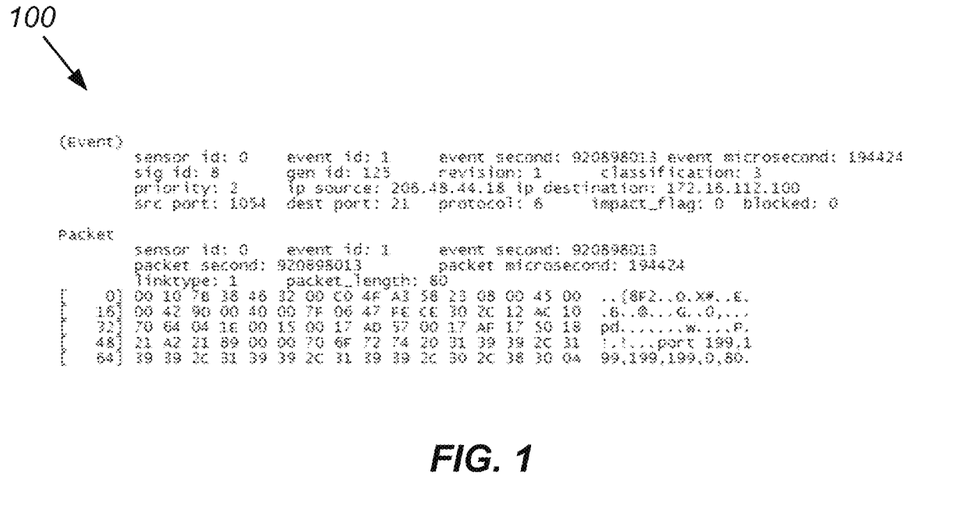
FIG. 1 shows an example of an intrusion detection system (IDS) alert.

The increase in network traffic and bandwidth between systems results in information overload to cyber defense analysts. Current solutions rely on a combination of IDS, intrusion prevention system (IPS), and security information and event management (STEM) technologies to support the analysis and defense of networks from cyber-attacks. However, attack scenarios in the midst of normal traffic consisting of various protocols such as HTTP, HTTPS, SMTP, SSH, IMAP, POP3, and FTP have resulted in large datasets being processed by IDS and IPS technologies. As with these traditional defense systems, the false positive rate can be extremely high making it difficult for analysts to process and interpret logs. Due to the large number of alerts being generated, IDS logs have become a "Big Data" analysis and storage issue as any cyber analysis will require not only the alert but also the network packets for future forensics. FIG. 1 shows an example diagram 100 of an IDS alert generated by Snort®, which is open-source network IDS software.

The disclosed embodiments were developed to decrease information overload to analysts by clustering related IDS alerts and providing the network context to understand whether a possible attack scenario has occurred. Unlike other technologies which focus on anomaly or signature detection to generate alerts, the disclosed embodiments represent a tool that can process those alerts. In order to accomplish this, the disclosed embodiments rely upon clustering similar alerts, relating them to the known network architecture, and presenting them in meaningful visualizations to facilitate discovery of attack scenarios. The system incorporates human in the loop in order to interpret, analyze, and recognize suspicious alert patterns.

In order to develop an intuitive analysis tool, network traffic and an IDS system generating alerts was required. However, generating network traffic datasets is a time consuming and difficult process. Generally, dataset generation should meet the following requirements: real-world, completeness in labeling, correctness in labeling, sufficient trace size, concrete feature extraction, diverse attack scenarios, and ratio between normal and attack traffic should all be considered during dataset generation. For purposes of development of the embodiments herein, and as an example, the synthetic 1999 KDDcup99 data set and real-life dataset ISCX-UNB may be processed using an IDS tool such as Snort® version 2.9.7.0.

Signature based IDS systems, such as Snort®, detect cyber-attacks by comparing known patterns of malicious traffic with network traffic to generate alerts. Though they are able to keep up in high traffic network environments, they lack the capability to detect zero day attacks with which no signatures have been created. For the development purposes of the disclosed embodiments, a signature-based IDS system was selected for alert generation as such a system is the most prominently deployed and offers the most consistent alert generation. It should be recognized that, in other embodiments, other types of IDS systems may be employed for alert generation purposes.

Figure 2:
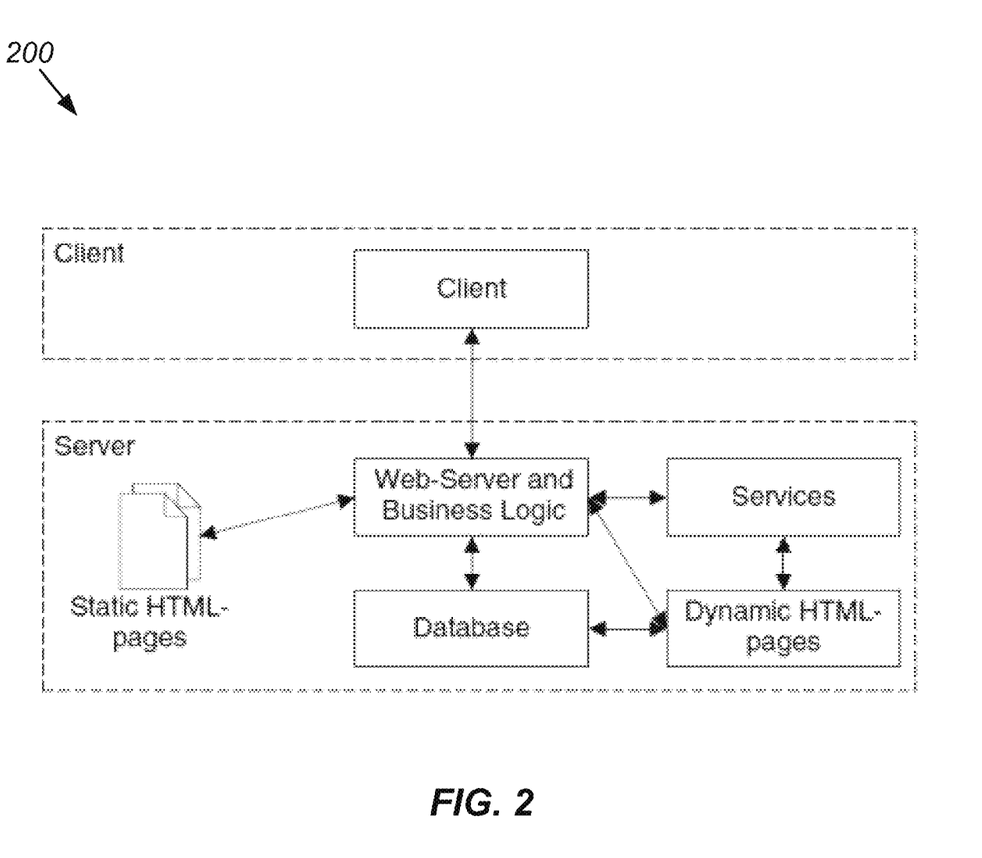
FIG. 2 shows a diagram illustrating a client-server web architecture that may be used for the embodiments of the system and method disclosed herein.

The disclosed embodiments were developed to quickly and easily implement highly optimized C/C++ and graphics processing unit (GPU) based algorithms for data analysis. In one embodiment, the system is a web tool based upon the traditional client-server model, as shown in diagram 200 in FIG. 2. The server side may be developed in CppCMS, which is a C++ web development framework, which was selected due to its capability to handle extremely high loads and to provide ease of integration for GPU-based algorithms, which are natively coded in the C/C++ language.

In the typical client server model, the client is able to access the service via a web page and the server handles the user requests. As mentioned, CppCMS may be used for the server backend capable of handling extremely high user requests. In this version of the system, the start and stop time (time window) is specified by the user. IDS logs within the time window are retrieved from a database, clustered using the k-means algorithm, and then graphed. The visualizations and analysis are used with a graph model of the network architectures.

Figure 3:
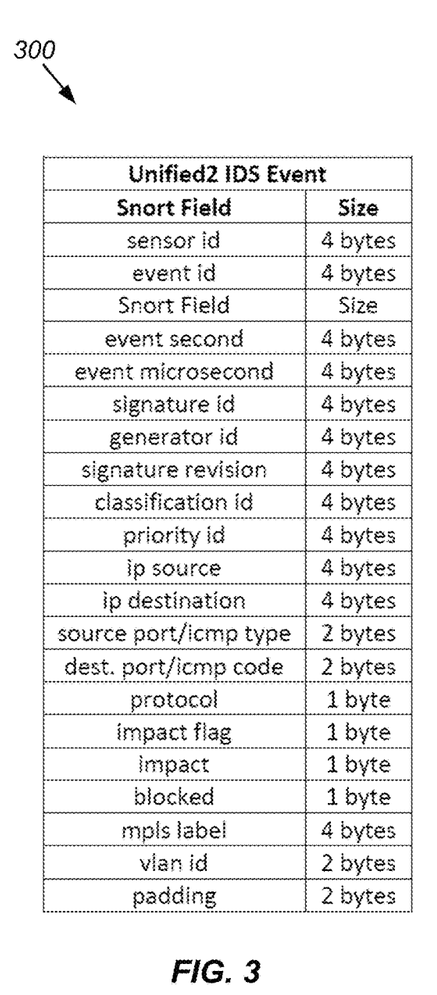
FIG. 3 shows a table illustrating an example event structure for a generated IDS alert.
Figure 4:
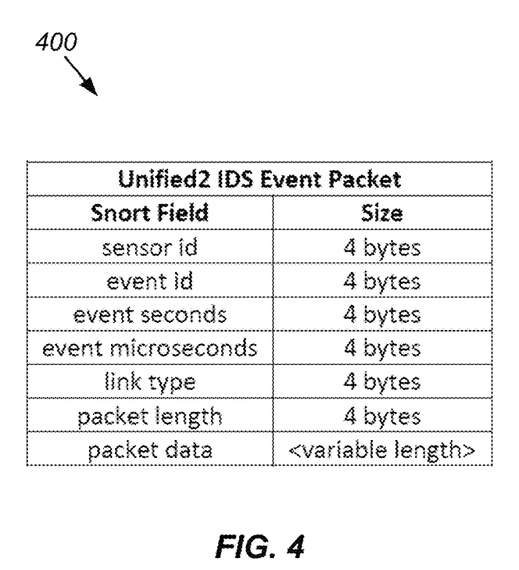
FIG. 4 shows a table illustrating an example event packet structure for a generated IDS alert.

The database portion of the disclosed system is populated from the alerts generated by the IDS system (e.g. Snort®). Snort® is an open source network intrusion prevention and detection system capable of performing real-time traffic analysis and packet logging on Internet Protocol (IP) networks. It is also able to operate in various modes for purposes of reading network packets, logging network packets, and network intrusion detection. As with any IDS system, network traffic needs to be present in order for alerts to be generated. Two data sets are used for the development of the disclosed embodiments, the synthetic DARPA's 1999 network intrusion data set with labeled attacks and the real-life dataset from University of New Brunswick, Shiravi, A. (2012). Using Barnyard2, an open source interpreter for Snort® binary output files, the alarms were saved into the commonly-used open source MySQL® database. Table 300 shown in FIG. 3 details the Unified2 data fields and data size for each alert. As well as logging each alert triggered in Snort®, the packet which caused the alert is also logged and described in Table 400 shown in FIG. 4.

When dealing with large data sets typical with any IDS system, a scalable and relatively inexpensive GPU can be utilized for powerful performance gains. Only as recently as 2007 did General Purpose Computing on Graphics Processing Units (GPGPU) become widely used for high performance computing. However, using GPUs adds a layer of complexity, which may be attributed to the overhead associated with GPU initialization and memory bandwidth, the transfer rate between the host CPU and device GPU. Before conducting timing analysis, a simple rule of thumb is to determine whether the problem is task parallel or data parallel. Task parallel refers to problems in which threads are able to work on different tasks independently, whereas data parallel refers to problems in which threads are performing the same computation but on different parts of data. When hundreds of processing cores are available, data parallel tasks benefit the most.

Memory bound algorithms are those in which the computation done for each data element is minimal and the bottleneck in performance is due to memory transfers. The other, computation bound, refers to problems in which the majority of the processing is occurring due to computations. Algorithms which are data parallel and computation bound make GPUs the ideal choice for increasing performance. CUDA® is a parallel computing platform and programming model developed by NVIDIA® Corporation. CUDA C Best Practices Guide recommends profiling applications for hotspots to quickly determine candidates for parallelization. As will be discussed later, the highly data parallel nature of the k-means clustering outweighs the fact that the data being processed is memory bound.

As described previously, the disclosed embodiments process IDS alarms, clusters, and are coupled with a network topology using graph database technology for added contextual information. The alerts may be saved in the Unified2 format which is parsed and stored in, for example, a MySQL® database. Of the available event fields in the alerts, the time stamp, source IP address, and destination IP address are used for the clustering portion of the disclosed embodiments.

Figure 5:
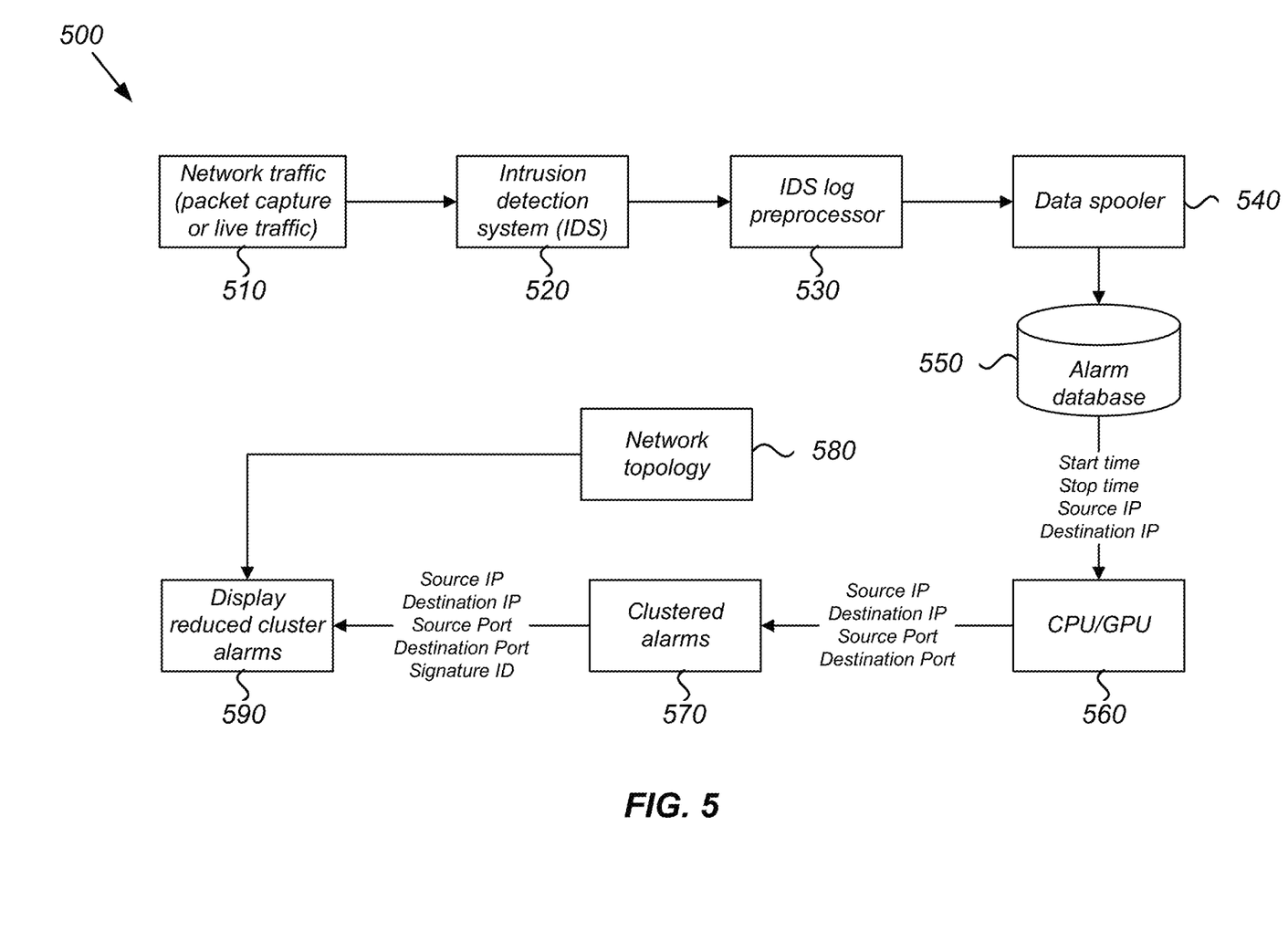
FIG. 5 shows a diagram illustrating the data flow process for the methods in accordance with the disclosed embodiments.

FIG. 5 shows a diagram 500 illustrating the process flow and features of importance for the modified k-means clustering and the use of network topology information in accordance with the disclosed embodiments. Box 510 represents the input of network traffic, which can be in the form of packet captures or live network traffic. The network traffic is input into box 520, which represents the IDS. As an example, the IDS may be the Snort® IDS, mode 29.7.0. The output of the IDS, namely the alarms, is directed to the IDS log preprocessor 530. As an example, the Snort® alarms are output in a unified2 format. After preprocessor 530, the alarms are directed to data spooler 540, an example of which is the Barnyard2 algorithm. The output of box 540 is stored within an alarm database 550, which may utilize MySQL® or other database software.

Information from database 550, such as start time, stop time, source IP, and destination IP, is then directed to CPU/GPU 560. CPU/GPU 560 has a modified k-means clustering algorithm implemented therein, which will be described in more detail below. Information such as source IP, destination IP, source port, and destination port is then used to create clustered alarms at box 570. This clustered alarm information, along with signature ID, is then combined with network topology information 580 to create ranked/reduced cluster alarms that are displayed to a user at box 590. As an example, network topology information 580 may be pulled from a relational database, such as database 1560 (shown in FIG. 15) or received from the network in real-time via a processor, such as processor 1570 (shown in FIG. 15) configured with the appropriate instructions for performing one or more of the steps of the embodiments of the method disclosed herein.

The following paragraphs will describe the modified k-means algorithm. The basic k-means algorithm is comprised of the seeding stage followed by the labelling stage. During the seeding stage, an initial clustering C is created by selecting k number of points as the initial centroids from the set of data points N where $C_j$ is a subset of N, j=1, . . . , k. To create a deterministic system, the initial centroids were not randomly generated, as is typical. After the initial clustering stage, the labelling stage is executed where each data point, $n_i$, an element of N, is assigned to the nearest cluster $C_j$ for which the Euclidean distance $D(n_i,c_j)$ is minimal. In order to prevent one feature from dominating the results, a weight factor as well as data normalization is used against the selected features. After assignment each centroid $C_j$ is then recalculated by the mean of all the data points within the particular centroid assignment. This process is repeated until the centroids no longer change.

From the top level description of the modified k-means clustering algorithm, it is immediately apparent that the Euclidean distance calculation for each node is data parallel. The modified k-means clustering can also either be memory bound or compute bound depending on the selection of the cluster size. In either event, the sequential algorithm lends itself to exploitation on the GPU.

Figure 6:
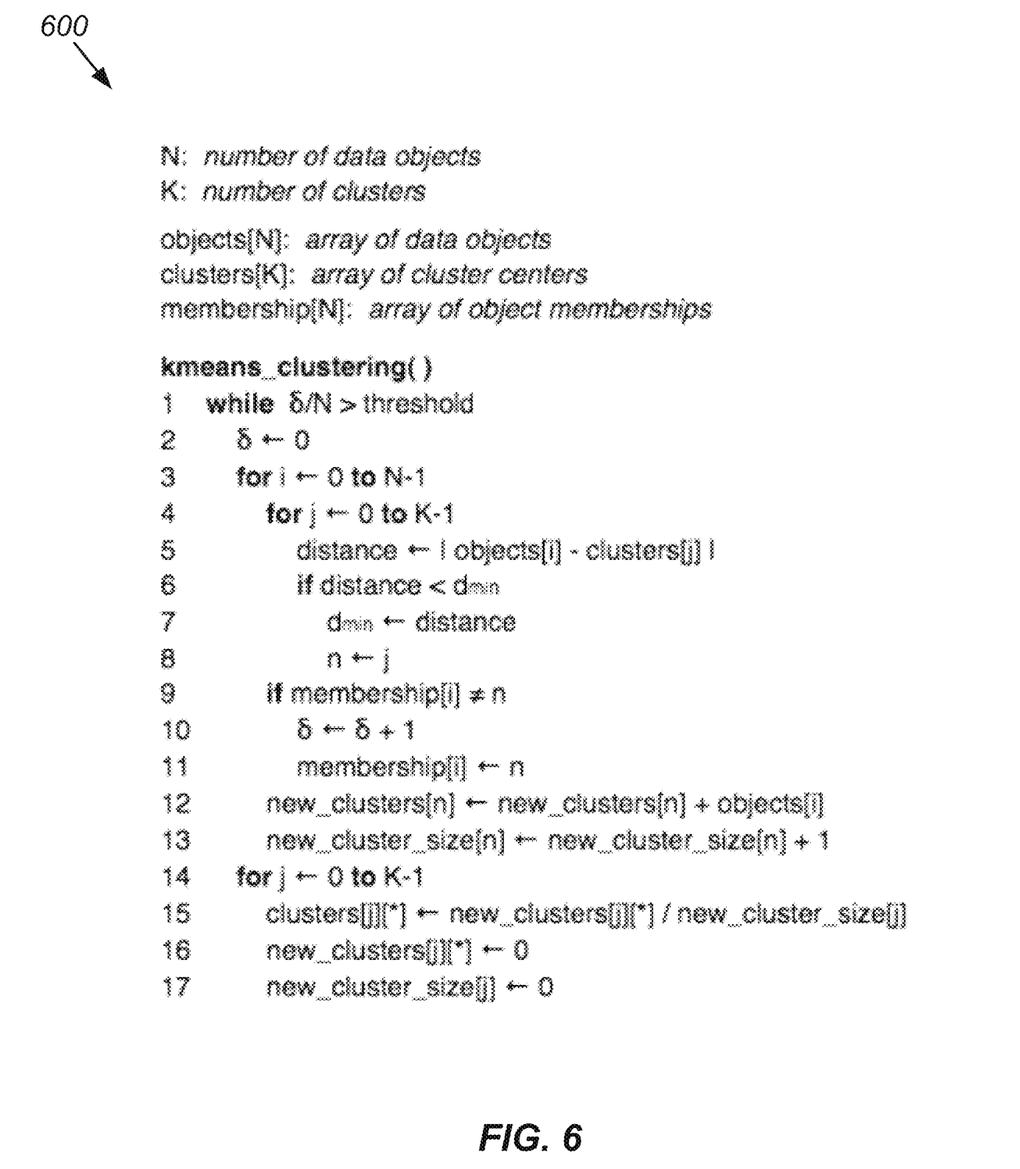
FIG. 6 shows a diagram illustrating a modified k-means clustering algorithm that may be used for the methods in accordance with the disclosed embodiments.

One embodiment of an implementation of the modified k-means clustering algorithm is illustrated by the code in diagram 600 shown in FIG. 6. As an example, the N data objects may be an array of arrays, where in an array such as [(source$_1$, destination$_1$, time$_1$), (source$_2$, destination$_2$, time$_2$), . . . [(source$_N$, destination$_N$, time$_N$)], (source$_1$, destination$_1$, time$_1$) represents object$_1$, (source$_2$, destination$_2$, time$_2$) represents objects, and (source$_N$, destination$_N$, time$_N$) represents object$_N$. Further in FIG. 6, K represents the number of clusters calculated, objects[N] represents the IDS log events, clusters[K] represents the centroids, which are not randomly generated, and membership[N] represents the clusterID.

Although the calculation is not complex, it does fall into the category of being data parallel and computationally bound when solving for large data sets. As with development of any sequential algorithm for parallel implementation, a basic understanding of processing time is required. TAU 2.24.1 was used to profile the sequential k-means algorithm using 11,952 IDS alerts, features, source IP, destination IP, and time stamp, and a cluster size of 2,390. The data points were generated using, DARPA's Intrusion Detection Data Sets (online), specifically the March 3rd Transmission Control Protocol (TCP) data dump. The test environment used for the sequential k-means timing included a Lenovo T440p laptop running the Ubuntu 14.04 LTS operating system using an Intel Core i7-4600M CPU with 8 GB memory and a Nvidia GeForce GT 730M GPU, having 384 cores, using a driver of a CUDA Driver 7.0, Runtime 7.0, with a version of CUDA Capability 3.5. Simulations confirmed the sequential k-means taking 68.2 seconds spent 95% of its time computing the Euclidean distance and 5% spent re-computing the centroids.

Having performed a quick timing analysis on the CPU sequential based k-means algorithm, the process of moving the Euclidean distance calculation from CPU to GPU should be less complex due to the data parallelism. As described in the NVIDIA® CUIDA® Programming Guide (online) there are various optimization techniques when it comes to GPU programming such as reducing unnecessary memory transfers between host and device, using page locked memory for faster access time, utilizing asynchronous memory copy and computations, and creating multiple threads for multiple concurrent memory copy and data computation. Five different versions of the k-means clustering algorithm were developed to compare the processing time for the same data set used above.

In order to use the modified k-Means effectively for clustering, three features are used to describe one IDS alert; source IP, destination IP, and timestamp. As previously mentioned, the three features were pre-processed to provide normalization and weighting in order to favor one feature over the others. More features could be selected to create very specific partitions, but for the purposes of the disclosed embodiments, creating partitions that facilitate the discovery of cyber intrusions is the goal. Thus, who and when are the initial primary concern and it follows that the source IP, destination IP, and time stamp are used. These three features provide a good context for who was talking to whom, when, and provides a good basis for partitioning. Take for example port scanning. The act of port scanning itself does not constitute a cyber-attack, but it does signify suspicious behavior, especially when TCP/IP requests from the same source IP using various ports occur within minutes. From this example it is clear that clustering alarms based on these three features provides significant insight into possible intruders. Other factors such as the cluster size and centroid selection also play a role in the end result.

The cluster size k selection is an independent problem when dealing with the k-means clustering. The value itself does not prevent the solution of the k-means clustering from being determined but it does affect the end result. Too high a value of k and every item essentially becomes its own cluster and too low a value and not enough clusters are formed. For the development of the disclosed embodiments, the cluster size k was based primarily on, p, the number of items per cluster expected to be formed within each partition; k=Total Points/p. A range of k values was simulated using a large dataset, DARPA's 1999 intrusion week 1 data.

As well as having control of the features and initial cluster size, the centroid selection plays a role in the number of iterations required for centroid convergence. Typically, centroids are randomly generated points within the data set N. Since the disclosed embodiments are primarily a tool for analysts, generating random centroids results in different partitions for each clustering request. In an effort to preserve repeatability, the centroid generation is conducted by selecting data points every multiple of k. This oversimplified case of centroid selection works well for IDS alerts, particularly since source IPs and destination IPs are distinct values. Thus, for the remaining timing analysis all initial centroids are generated in this fashion. Another method for centroid generation was also explored but not used for timing analysis; using the unique IP subnet of every multiple of k data point and using the corresponding network IP.

Figure 7:
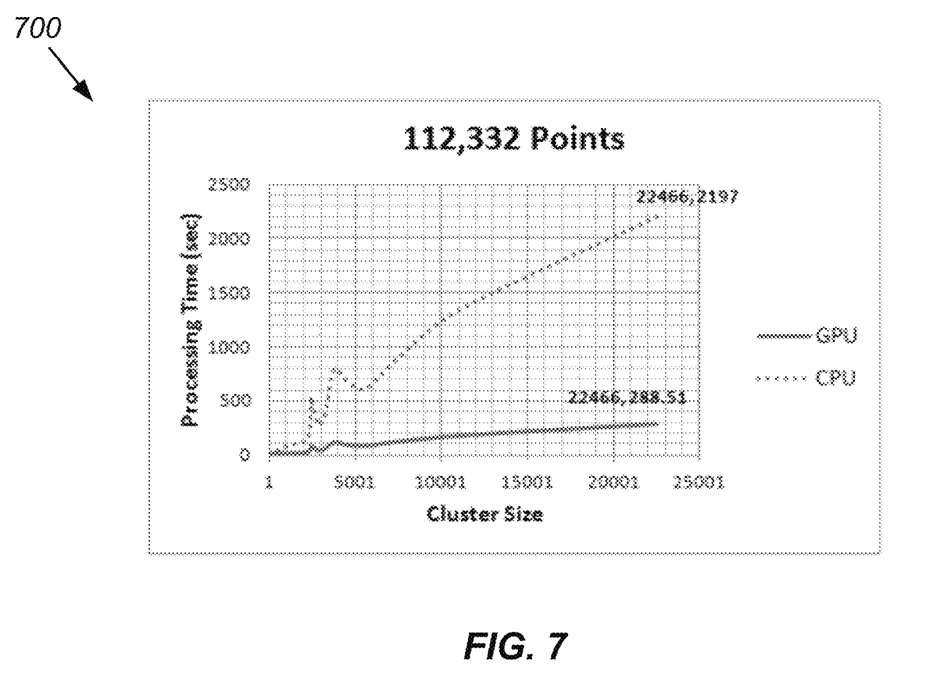
FIGS. 7 and 8 show graphs illustrating CPU vs. GPU processing time for implementation of the modified k-means clustering algorithm that is deterministic as well as weighted for network subnets for various cluster sizes.
Figure 8:
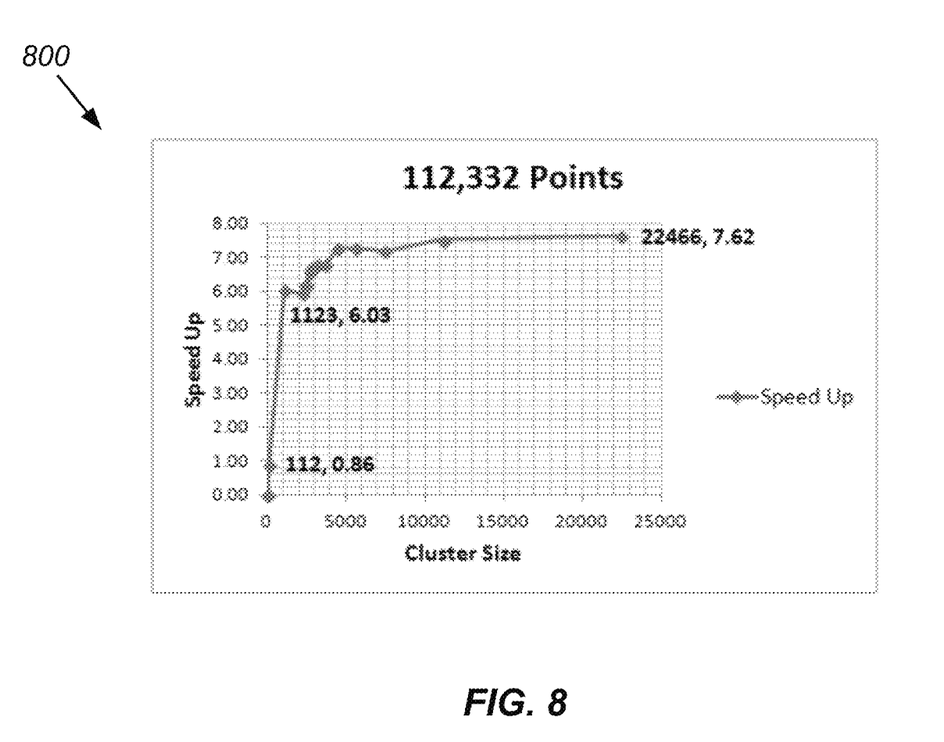

Timing analysis on various cluster sizes was conducted in order to determine a realistic performance gain when clustering IDS alerts. FIGS. 7 and 8 depict graphs 700 and 800, respectively, showing the results conducted between the CPU and GPU implementation of the k-means clustering for various cluster size. As cluster size is varied, processing time can vary between tens of seconds to tens of minutes. Based on CPU and GPU comparisons it was found that for one particular test environment processing 112,332 data points with 112 clusters offered a reduction in performance. This is expected as the memory overhead associated with GPU kernel execution outweighs the data parallelism attained during the Euclidean Distance calculation. It can be seen when dealing with large data sets the GPU k-means excels with as much as a 7.5 times speed up when p is 5. Inspection of the final clusters also proved that the partitioning provided desired source IP to destination IP communications clustered within similar time frames.

Unlike the MySQL relational database used to store the IDS alerts discussed previously, graph database uses nodes and links to relate data items stored. The nature of the graph database using relationships allows retrieval of complex relationships much simpler, whereas, in traditional relational databases keys are used and multiple tables must be traversed and joined in order to return the result of complex relationships. One example of a graph database technology that may be used in accordance with the disclosed embodiments is Neo4J. Neo4J is an open source technology and provides native graph storage eliminating the need for expensive index and joins which become more expensive as more data is stored. Performance is increased when compared to traditional relational databases because every data node is explicitly connected to every related entity.

Due to the very nature of nodes and links, much the same way network systems are connected, network diagrams can readily translate into nodes and edges, with nodes being the switch or router and links or edges being the relationship of their physical or logical connections. This network context provides supplemental information when conducting cyber analysis. For the disclosed embodiments, the network diagrams were provided from the DARPA 1999 documentation (online) and for the University of New Brunswick data set, via ISCX 2012 Shiravi A. (online). The large difference between the 1999 DARPA and the ISCX network diagrams is that ISCX includes a NAT server communicating with the outside web. This provides the real-life context typical network environments being defended and monitored will encounter. For this particular study, the network captures are behind the NAT and no firewall is present, meaning IP addresses and ports are not obfuscated making correlation between victim and attacker transparent.

However, with both datasets, the location and user profiles are not included. This supporting contextual information can be important during a cyber event such as in the event of a Denial of Service attack where a server or services are rendered unavailable, whereas in a guess password via telnet for guest account may help indicate possible attacker motives. Motive, network context, and IDS alerts can be leveraged to provide a much more complete attack scenario providing analysts with better understanding of intent.

Figure 9:
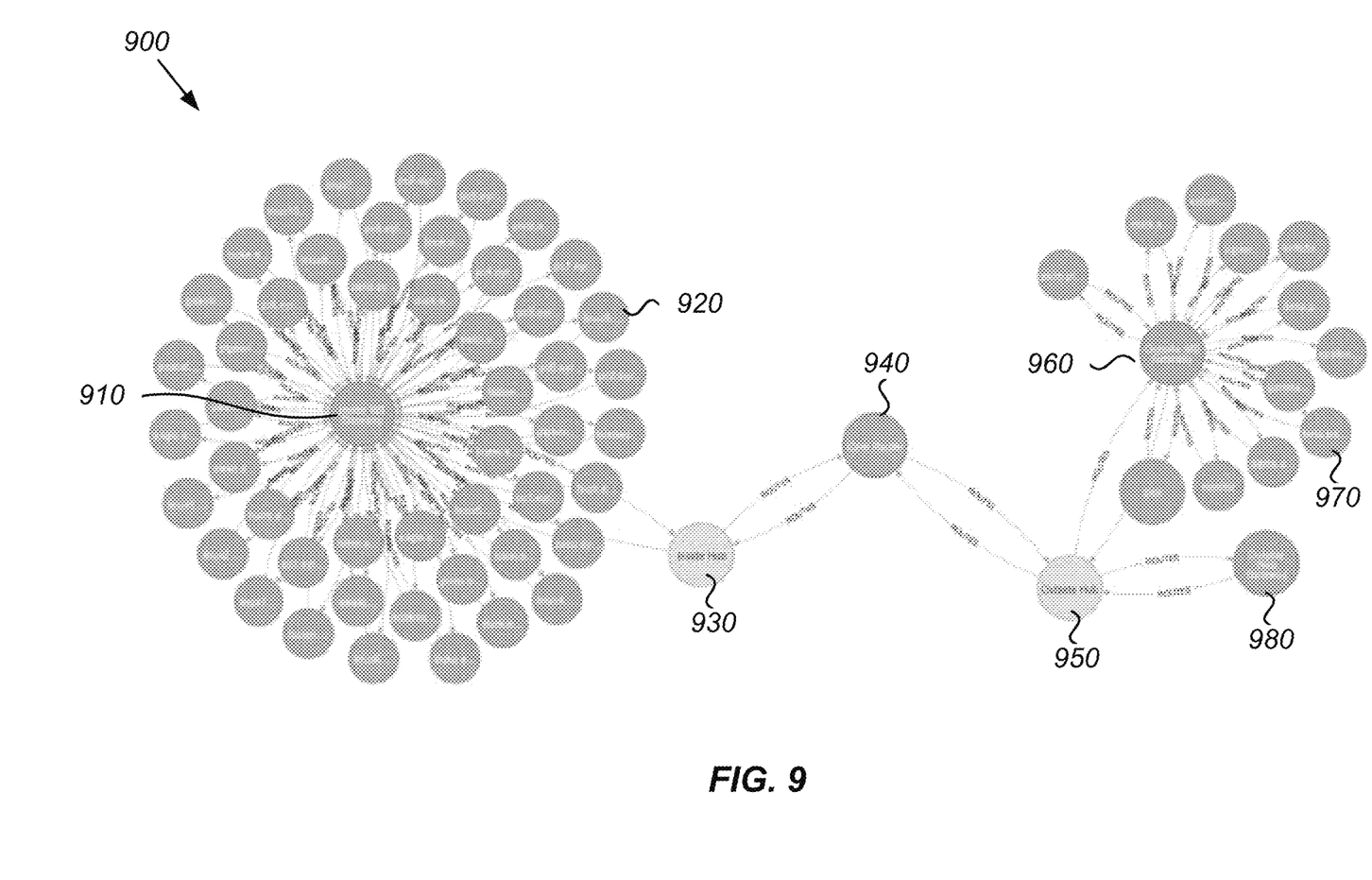
FIG. 9 shows a diagram illustrating an embodiment of a graphical representation of the cluster results in a graph database format.

The disclosed embodiments may operate using manual network generation for the data path between users inside the network and outside the network. FIG. 9 shows a diagram 900 depicting the Neo4J implemented graph database model of the 1999 DARPA system. As shown, nodes include an inside workstation gateway 910 with users 920, an inside hub 930, a core router 940, an outside hub 950, an outside workstation gateway 960 with users 970, and an outside web gateway 980. The user nodes include the user contextual information such as IP address, host name, operating system, and any supplemental notes provided from the documentation. Similarly, for the ISCX UNB data the 6 subnets 192.168.x.x, NAT server, Main Server, Secondary Server, router, and inside workstations were modeled. From diagram 900, the network division and separate users are not immediately apparent. In some embodiments, the graph model may be automated and may be based on packet data flow. These capabilities provide a better context of communication traversals between subnets.

Figure 10:
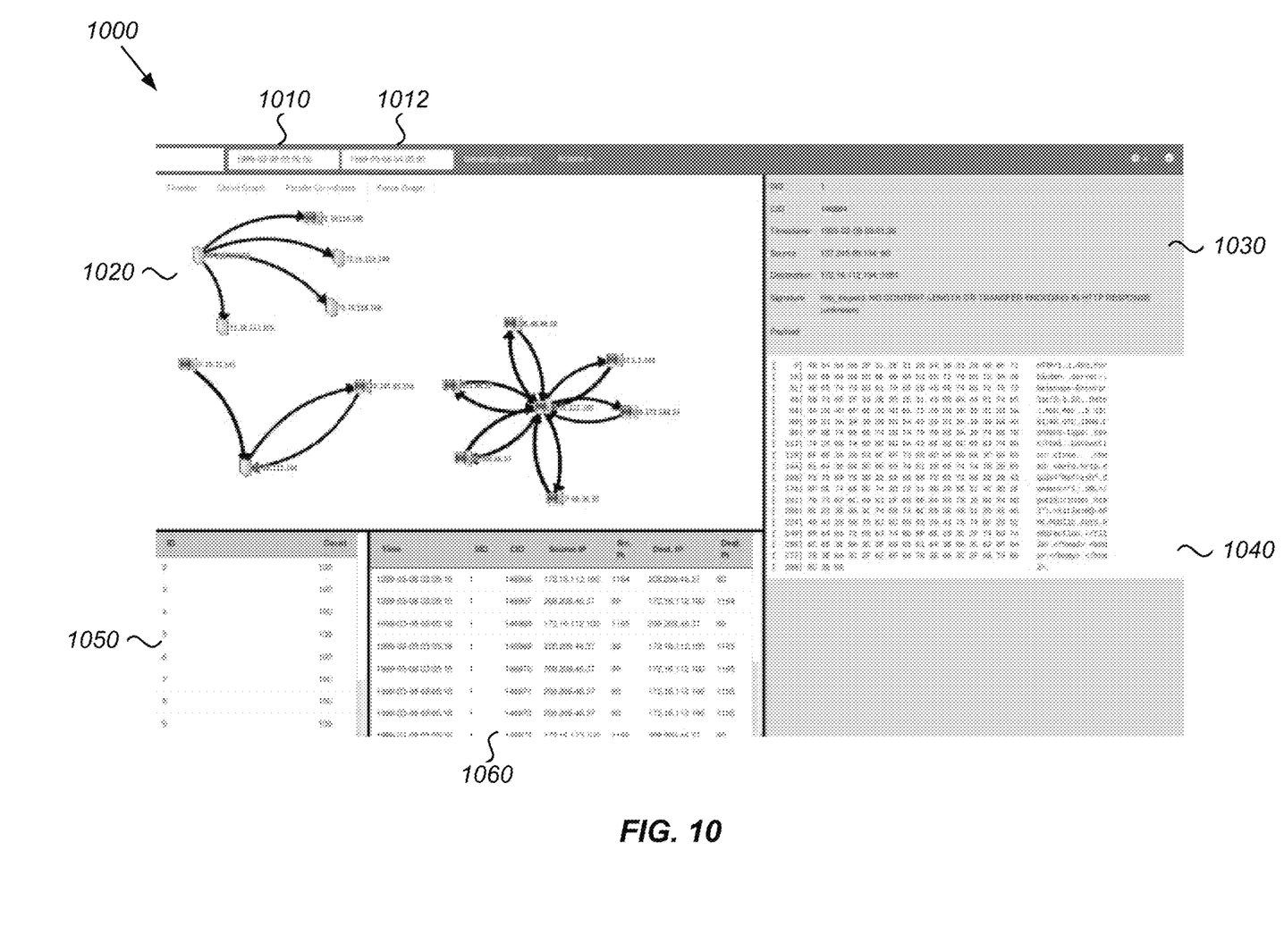
FIG. 10 shows an embodiment of a graphical user interface that may be used to display results in accordance with the systems and methods disclosed herein.

Integrating all components—CppCMS, MySQL®, Snort®, Barnyard2, and the GPU enabled k-means library—into the disclosed framework, the system was tested. The same test environment used for the modified k-means clustering analysis was also used for the system. The implementation of the clustering portion of the system is presented in the form of a graphical user interface 1000 shown in FIG. 10. As shown in FIG. 10, box 1010 represents the selected start time for analysis and box 1012 represents the selected stop time for analysis. Box 1020 represents the communications between each source and destination device in the selected alarm cluster ID. Box 1030 represents the detailed alarm data for the respective individual alarm in the selected cluster ID, which includes the packet capture information 1040. Box 1050 represents the number of alarms clustered and their respective cluster ID. Box 1060 represents the list of individual alarms in the selected cluster ID.

In operation, the user inputs the desired start time and stop time and requests the cluster generation to start. The service then requests data from the database, parses for the source IP, destination IP, and timestamp for the specified time window. After which, the data is clustered (labeled) using the GPU enabled modified k-means algorithm. The label is then saved into a new table and stored in the database for this particular cluster generation request. Once complete, the clusters are presented to the user and the other fields populated. The other fields present the graph of the clusters, a tabular view of the alerts within the cluster and detailed information regarding each user selected alert. This becomes the starting point for cyber forensics to take place and for human interpretation to begin.

Figure 11:
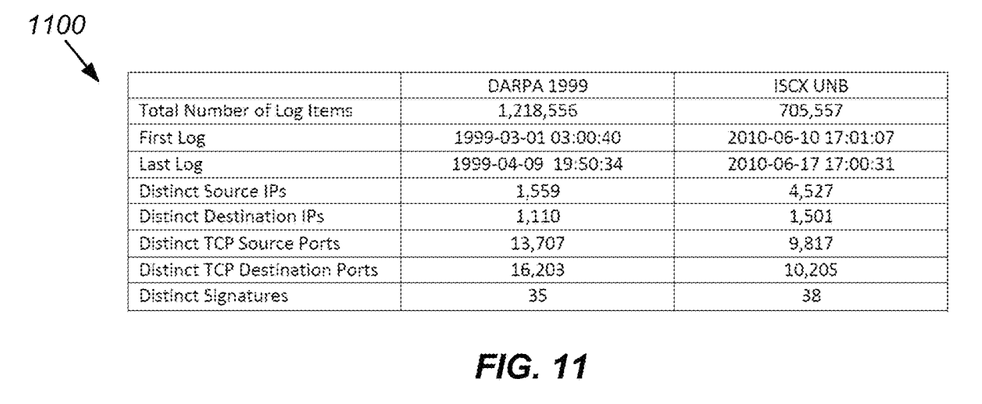
FIG. 11 shows a table illustrating network dataset generated alerts from provided packet captures.
Figure 12:
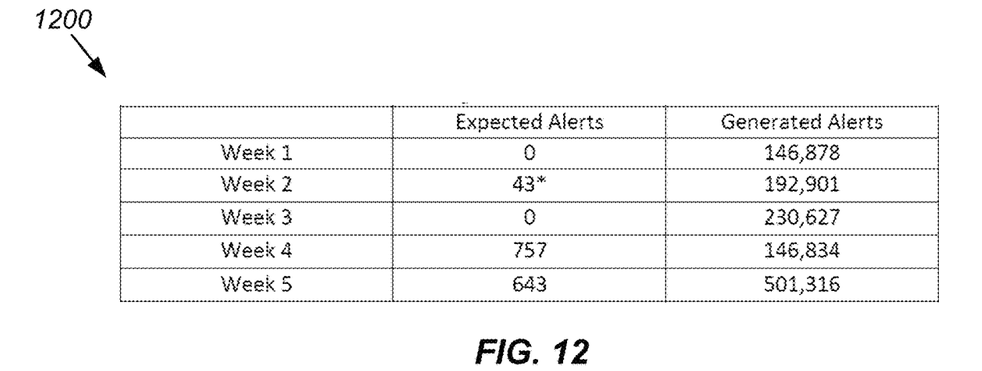
FIGS. 12 and 13 show tables illustrating IDS alerts generated using a particular IDS and different datasets.
Figure 13:
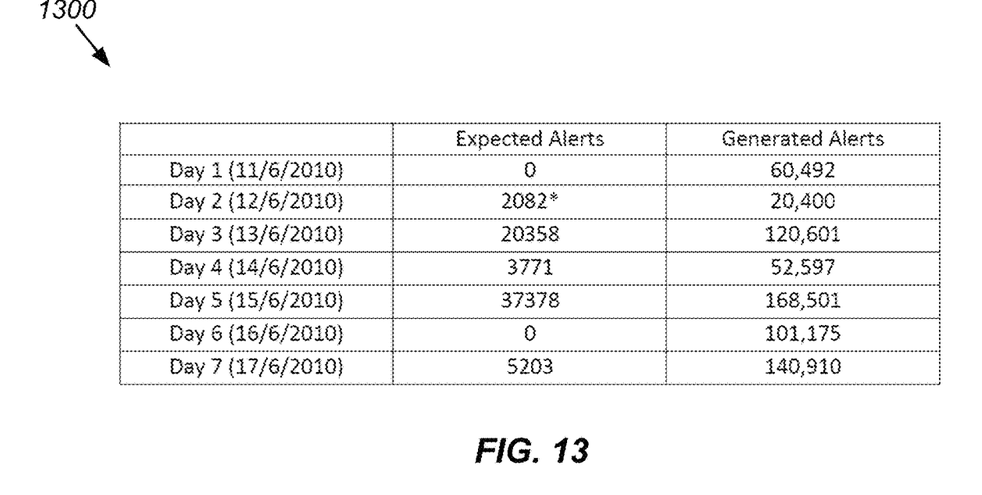

The disclosed embodiments are able to quickly cluster events and display the results; however, the detection and reporting of alerts still relies on the IDS. In this manner, the disclosed embodiments provide a tool for facilitating the processing of large amounts of IDS alerts and groups of events rather than single events. FIGS. 11-13 show tables 1100-1300, respectively, that describe the DARPA 1999 weeks 1-5 and the ISCX UNB dataset results captured by Snort® for each respective dataset.

The DARPA 1999 dataset Week 2 labeled data contained 43 attacks, of which 5 were discovered: Ntinfoscan, back, back, mailbomb, mailbomb Darpa 1999 (online). One was possibly detected, satan, and 36 of the remaining attacks were not detected amongst 192,901 alerts generated that week. Table 1200 describes the results per week of the 1999 dataset. The DARPA 1999 labeled attacks for Week 2 only provided the start time, source IP, and destination IP and may have consisted in a larger set of alerts being generated. Table 1300 describes the alerts tagged which were provided as part of the UNB ISCX dataset and the Snort® generated alerts. It should be noted that the UNB ISCX labeled data revealed that although Day 2 was stated to be attack free, the labeled data sets revealed 2082 tagged as attacks. The results reveal that the signature based IDS performs perform poorly on the DARPA 1999 dataset week 2.

Exploiting the GPU for k-means clustering of the IDS alerts provides for an up to 7.5 times performance increase. Centroid selection and cluster size determination have been shown to allow broad selections while maintaining system performance. The success of the GPU enabled k-means library with all components proves that a successful web framework has been developed along with the use of graph database technology for complex query searches. In some embodiments, automatic network models may be generated based on packet data, the integration of IDS alerts with packet flow data, and network system diagrams.

Figure 14:
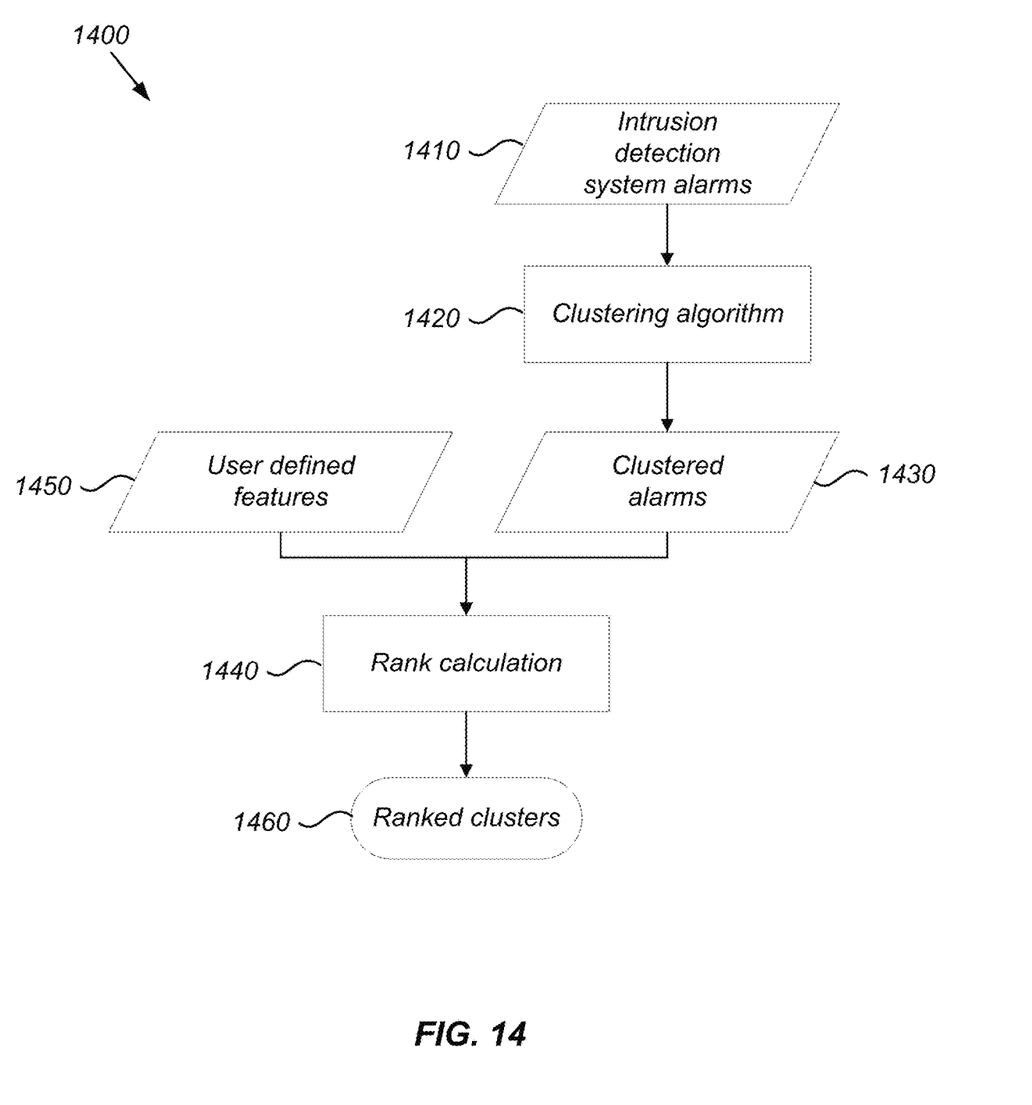
FIG. 14 shows a flowchart of an embodiment of a method in accordance with the systems and methods disclosed herein.

FIG. 14 shows a flowchart of an embodiment of a method 1400 in accordance with the systems and methods disclosed herein. In some embodiments the steps of method 1400 may be performed as shown in FIG. 14, in other embodiments the steps may be performed in a different order, or certain steps may occur simultaneously with one or more other steps.

Alarms 1410 generated by an IDS are input into a clustering algorithm 1420, such as the modified k-means algorithm as discussed herein. The clustering algorithm 1420 takes an array of values from the alarms generated by the IDS. The specific features used may include source IP, destination IP, source port, and destination port. The resulting output from algorithm 1420 is clustered alarms 1430. Once the clusters are generated for each IP address, the rank value is then assigned at box 1440. The ranking calculation 1440 involves user input in the form of user defined weighted percentage values for specific features 1450. The rank value is determined by the following rank value calculation equation:

$$\text{Rank Value} = \text{Feature1(User Defined \%)} + \text{Feature2(User Defined \%)} + \text{FeatureX(User Defined \%)} \quad \text{(Eq. 1)}$$

The ranked source IPs are then used to rank the previously determined clusters from box 1420 based upon total rank value of all of the source IPs present within the cluster. The resulting ranked clusters 1460 are then displayed to the user in a graphical representation of events based upon one or more of source IP, destination IP, source port, destination port, and other pertinent IDS alarm data. An example of such graphical representation is shown in FIG. 10.

One possible use of this system is to automatically calculate and provide the user with a starting point for cyber analysis. The ranked clusters and ranked IP addresses will reflect the importance of the features selected and weighted by the user, thus allowing for customization based upon network architecture or features priorities.

The system may be easily adjusted to work with other network alarm data and network architectures as the features and weights for the ranks can be adjusted based upon user needs. Ranking the features and clustered alarms based upon user weights also accounts for relationships that statistical correlation which only provide strength of relationship or statistics which only provides generalization of large amounts of data. The system may be modified to work on other data sets where each event/data entry can be identified by a unique set of features that can also be distinctly weighted.

Method 1400 may be implemented as a series of modules, either functioning alone or in concert, with physical electronic and computer hardware devices. Method 1400 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Figure 15:
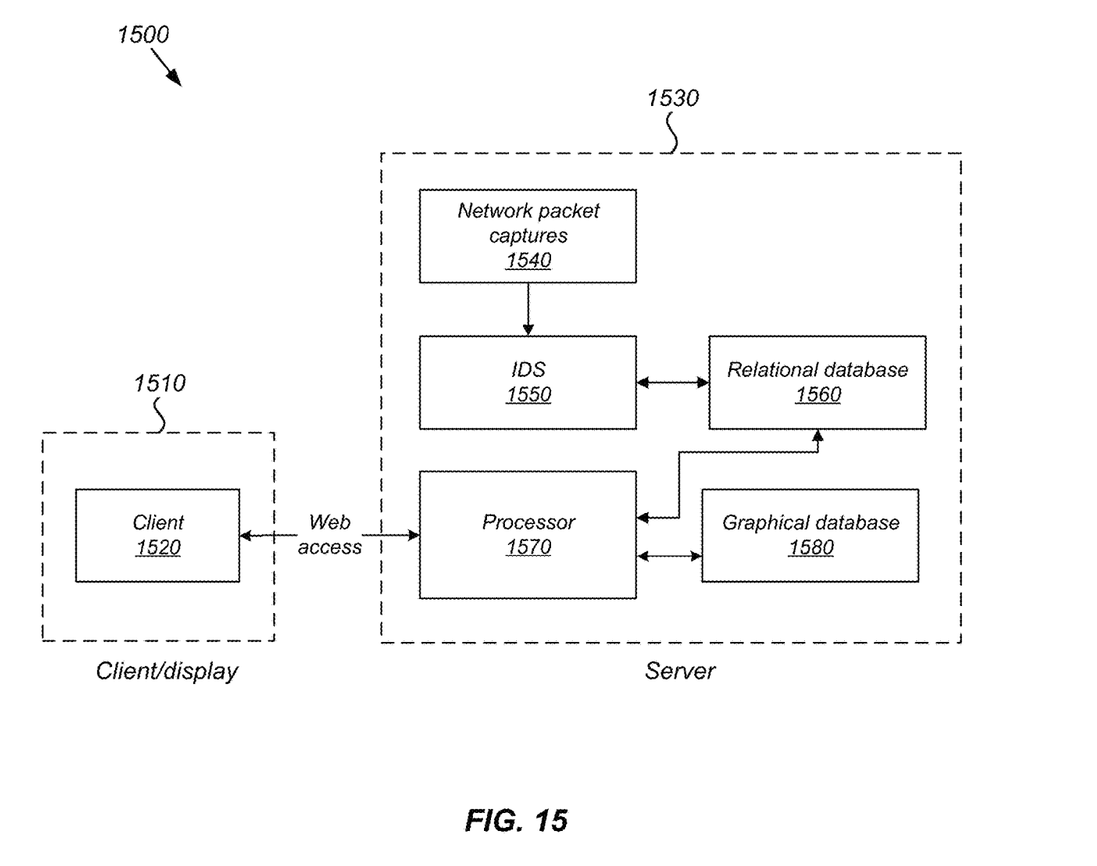
FIG. 15 shows a diagram illustrating a system that may be used to perform one or more methods in accordance with the disclosed embodiments.

FIG. 15 shows a diagram 1500 illustrating a system that may be used to perform one or more methods in accordance with the disclosed embodiments. System 1500 includes a client/display 1510 and a server 1530. A client 1520 may access server 1530 via the Internet or other network. At server 1530, network packet captures 1540 are input into IDS 1550. The alarms generated from IDS 1550 may be stored in a relational database 1560. Database 1560 may additionally store other information such as network topology, user-defined parameters, or any other information necessary for the implementation of the embodiments disclosed herein. Processor 1570 may access the alarms stored in database 1560 and process them in accordance with the clustering, ranking, and other methods disclosed herein. Processor 1570 can also access network topology information stored within graphical database 1580 and use this information, along with the processed alarm/cluster information, and provide to client 1520 for display.

Figure 16:
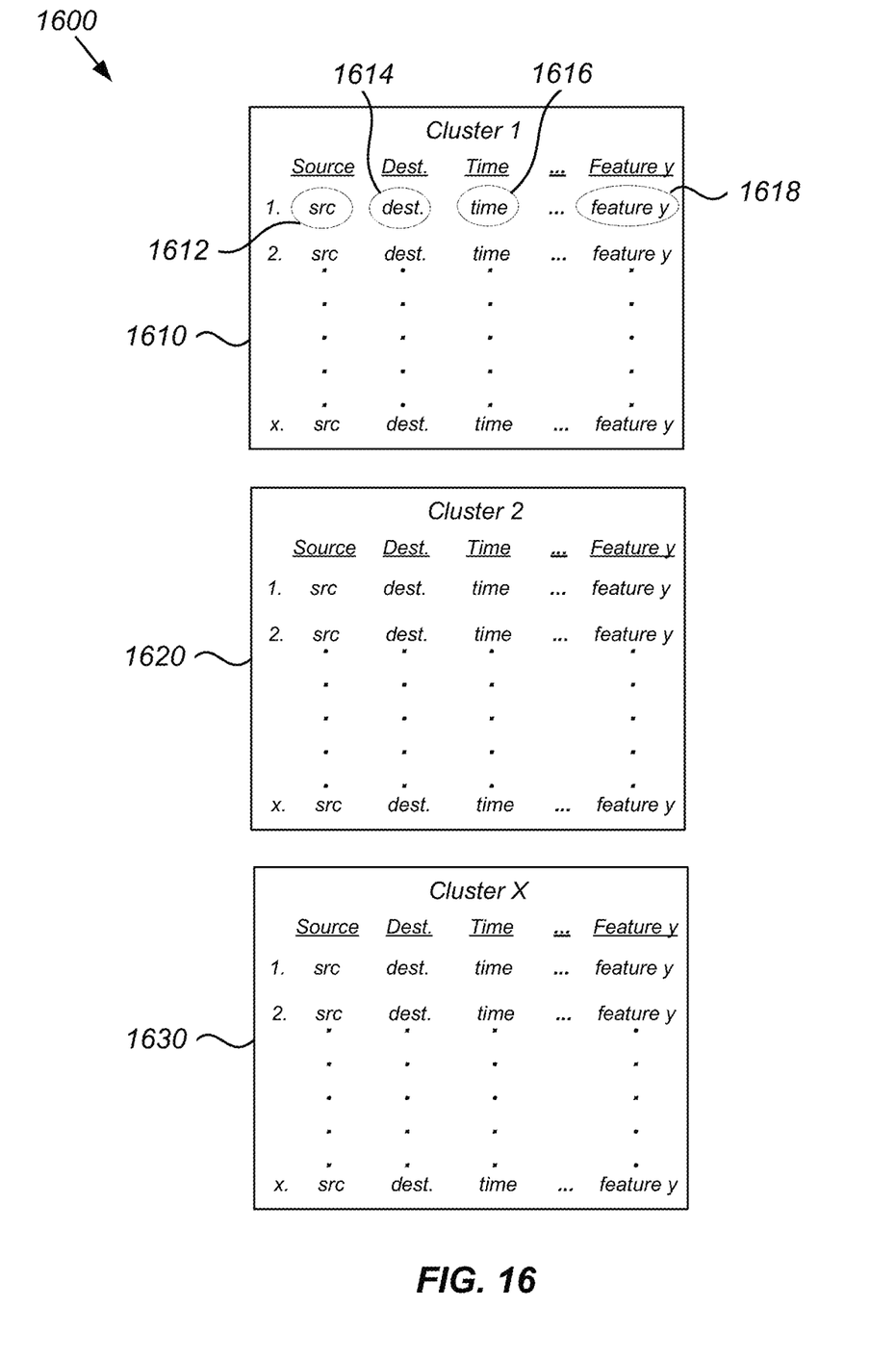
FIG. 16 shows a diagram illustrating alarm clusters generated in accordance with the disclosed embodiments.

FIG. 16 shows a diagram 1600 illustrating alarm clusters generated in accordance with the disclosed embodiments. Diagram 1600 shows cluster 1 1610, cluster 2 1620, and cluster X 1630, where X is any positive number greater than 2. Each of clusters 1610, 1620, and 1630 represent groups of alarms that were determined using the clustering algorithm, such as the modified k-means algorithm disclosed herein. Each cluster includes a number of alarms 1 to x, where x is any positive number greater than 2. Each alarm includes an array of features. As shown in cluster 1, feature 1 1612 is source IP, feature 2 1614 is destination IP, feature 3 is timestamp, with each of the features representing normalized data. Each alarm may include additional features up to feature y 1618. As an example, other features may include protocol type, IP source port, IP destination port, alert type, and packet size. The features are predefined by a user of the system, as are the weights to be applied to each of the features as part of the rank calculation.

The rank value is determined for each of the alarms within each cluster. For example, if cluster 1 has 100 alarms, there are 100 rank values calculated using Eq. 1 above. Then, for each cluster, a cluster rank is determined according to the following equation:

$$\text{cluster rank} = \frac{rankvalue1 + rankvalue2 + \cdots rankvaluex}{x}, \quad \text{(Eq. 2)}$$

where x is the number of alarms in the cluster. Using the cluster rank, a user of the system can then couple such information with a network topology using graph database technology for added contextual information which is provided to a user via a graphical user interface such as that shown in FIG. 10.

Many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

I claim:

1. A method comprising the steps of:
   using a graphics processing unit (GPU) to generate, with a modified k-means clustering algorithm, more than one clusters of alarms produced by an intrusion detection system (IDS), wherein each alarm within each cluster of alarms includes features comprising source IP address, destination IP address, and timestamp, and wherein the modified k-means clustering algorithm comprises the following steps
   a.) creating an initial clustering C by nonrandomly selecting k number of points as initial centroids from a set of data points N where $C_j$ is a subset of N, j=1 . . . , k,
   b.) assigning each data point, $n_i$ to the nearest cluster $C_j$ for which a Euclidean distance $D(n_i, c_j)$ is minimal,
   c.) after assigning each data point, recalculating each centroid $C_j$ by the mean of all the data points within the particular centroid assignment, and
   d.) repeating steps a.) through c.) until the centroids no longer change;
   determining a rank value for each alarm within each cluster of alarms by summing a user-defined weighted value for each feature within the respective alarm;
   determining a cluster rank for each cluster of alarms by summing each of the rank values within each cluster and dividing by the number of alarms in the respective cluster;
   using the source IP address to determine a network IP address and subnet of a network architecture associated with the source IP address; and
   graphically displaying the cluster ranks to a user using a graphical database, wherein each of the clusters of alarms are mapped to a node link pair in the graphical database using an a priori logical network topology based upon the network IP address and the subnet of the network architecture.

2. The method of claim 1, wherein the selection of initial centroids in step a.) is performed by selecting data points every multiple of k.

3. The method of claim 1, wherein the more than one clusters of alarms are generated within a time window set by a user.

4. The method of claim 1, wherein the features further comprise at least one of source port, destination port, protocol type, and packet size.

5. The method of claim 1, wherein the graphical database is included within a graphical user interface.

6. The method of claim 5, wherein the graphical user interface further includes a listing of communications between each source and destination device in a selected alarm cluster ID.

7. The method of claim 5, wherein the graphical user interface further includes detailed alarm data for each respective individual alarm in a selected cluster ID.

8. The method of claim 7, wherein the detailed alarm data includes packet capture information.

9. The method of claim 5, wherein the graphical user interface further includes a number of alarms clustered and their respective cluster ID.

10. The method of claim 5, wherein the graphical user interface further includes a list of individual alarms in a selected cluster ID.

11. A method comprising the steps of:
    generating with a graphics processing unit (GPU) more than one clusters of alarms produced by an intrusion detection system (IDS) using a modified k-means algorithm, wherein the more than one clusters of alarms are generated within a time window set by a user, wherein each alarm within each cluster of alarms includes features comprising source IP address, destination IP address, and timestamp, and wherein the modified k-means clustering algorithm comprises the following steps:
    a.) creating an initial clustering C by nonrandomly selecting k number of points as initial centroids from a set of data points N where $C_j$ is a subset of N, j=1 . . . , k,
    b.) assigning each data point, $n_i$ to the nearest cluster $C_j$ for which a Euclidean distance $D(n_i, c_j)$ is minimal,
    c.) after assigning each data point, recalculating each centroid $C_j$ by the mean of all the data points within the particular centroid assignment, and
    d.) repeating steps a.) through c.) until the centroids no longer change;
    determining a rank value for each alarm within each cluster of alarms by summing a user-provided weighted value for each feature within the respective alarm;

determining a cluster rank for each cluster of alarms by summing each of the rank values within each cluster and dividing by the number of alarms in the respective cluster;

using the source IP address to determine a network IP address and subnet of a network architecture associated with the source IP address; and graphically displaying the cluster ranks to a user using a graphical database, wherein the graphical database is included within a graphical user interface, wherein each of the clusters of alarms are mapped to a node link pair in the graphical database using an a priori logical network topology based upon the network IP address and the subnet of the network architecture.

12. The method of claim 11, wherein the graphical user interface further includes a listing of communications between each source and destination device in a selected alarm cluster ID.

13. The method of claim 11, wherein the graphical user interface further includes detailed alarm data for each respective individual alarm in a selected cluster ID.

14. The method of claim 13, wherein the detailed alarm data includes packet capture information.

15. The method of claim 11, wherein the graphical user interface further includes a number of alarms clustered and their respective cluster ID.

16. The method of claim 11, wherein the graphical user interface further includes a list of individual alarms in a selected cluster ID.

* * * * *